United States Patent
Igartua et al.

(10) Patent No.: US 9,510,281 B2
(45) Date of Patent: Nov. 29, 2016

(54) PRIORITY ARBITRATION FOR INTERFERENCE MITIGATION

(71) Applicant: QUALCOMM Incorporated, San Diego, CA (US)

(72) Inventors: Fernando Igartua, San Diego, CA (US); Nir Gerber, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 14/491,175

(22) Filed: Sep. 19, 2014

(65) Prior Publication Data

US 2016/0088554 A1    Mar. 24, 2016

(51) Int. Cl.
*H04B 1/12*     (2006.01)
*H04B 15/02*    (2006.01)
*H04W 52/02*    (2009.01)
*G06F 13/42*    (2006.01)
*H04W 4/00*     (2009.01)
*H04W 88/06*    (2009.01)

(52) U.S. Cl.
CPC ...... *H04W 52/0209* (2013.01); *G06F 13/4221* (2013.01); *H04B 1/123* (2013.01); *H04B 15/02* (2013.01); *H04W 4/008* (2013.01); *H04W 88/06* (2013.01)

(58) Field of Classification Search
CPC . H04B 15/00; H04B 15/02; H04W 52/0209; H04W 52/0225; H04W 36/16; H04W 36/20; H04N 1/00994; H04N 21/4436
See application file for complete search history.

(56) References Cited

U.S. PATENT DOCUMENTS

| | | |
|---|---|---|
| 7,430,400 B2 | 9/2008 | Russo et al. |
| 7,617,342 B2 | 11/2009 | Rofougaran |
| 8,107,880 B2 | 1/2012 | Okker et al. |
| 8,189,710 B2 * | 5/2012 | Guo ............ H04B 1/406 370/254 |
| 8,493,992 B2 | 7/2013 | Sella et al. |
| 8,599,709 B2 | 12/2013 | Chen et al. |

(Continued)

FOREIGN PATENT DOCUMENTS

EP    2355380 A1    8/2011

OTHER PUBLICATIONS

International Search Report and Written Opinion for PCT/US2015/045015, mailed Nov. 12, 2015, 15 pages.

(Continued)

*Primary Examiner* — Brian O'Connor
(74) *Attorney, Agent, or Firm* — Withrow & Terranova, PLLC

(57) ABSTRACT

Aspects of priority arbitration for interference mitigation are disclosed. In one aspect, a computing device is provided that employs a control system configured to arbitrate the activity of multiple interfaces. This arbitration mitigates potential electromagnetic interference (EMI) that may degrade the performance of the computing device. Upon a first interface requesting to become active, the control system is configured to determine if a second interface is currently active. If so, the control system is configured to arbitrate the activity of the first interface and the second interface to mitigate the potential EMI generated if the interfaces are concurrently active. The computing device includes an aggressor controller and a victim receiver, each corresponding to a particular interface. The control system is configured to arbitrate such activity so that the aggressor controller and corresponding cable do not generate EMI during a time period that would degrade the performance of the victim receiver.

28 Claims, 5 Drawing Sheets

(56) References Cited

U.S. PATENT DOCUMENTS

| | | | | |
|---|---|---|---|---|
| 8,831,655 B2* | 9/2014 | Burchill | | H04W 52/243 370/310 |
| 9,042,881 B2* | 5/2015 | Kwon | | H04B 1/1027 370/242 |
| 9,215,654 B2* | 12/2015 | Clark | | H04W 52/0235 |
| 2011/0319022 A1* | 12/2011 | Arad | | H04W 4/023 455/41.2 |
| 2012/0178386 A1 | 7/2012 | Pascolini et al. | | |
| 2012/0281563 A1 | 11/2012 | Comsa et al. | | |
| 2012/0282861 A1* | 11/2012 | Linde | | H04B 1/40 455/63.1 |
| 2013/0109323 A1* | 5/2013 | Ruutu | | H04B 5/0031 455/68 |
| 2013/0225100 A1* | 8/2013 | Chen | | H04W 16/14 455/78 |
| 2013/0331137 A1* | 12/2013 | Burchill | | H04W 52/243 455/501 |
| 2014/0087663 A1 | 3/2014 | Burchill et al. | | |
| 2014/0198697 A1* | 7/2014 | Jeanne | | H04W 52/0212 370/311 |
| 2014/0221028 A1* | 8/2014 | Desai | | H04B 15/00 455/501 |
| 2014/0241406 A1* | 8/2014 | Yu | | H04B 15/02 375/219 |
| 2014/0347565 A1* | 11/2014 | Fullam | | H04N 5/607 348/738 |
| 2015/0133185 A1 | 5/2015 | Chen et al. | | |
| 2015/0256760 A1* | 9/2015 | Ju | | H04N 9/045 348/256 |

OTHER PUBLICATIONS

Second Written Opinion for PCT/US2015/045015, mailed Aug. 5, 2016, 9 pages.

* cited by examiner

PRIORITY ARBITRATION FOR INTERFERENCE MITIGATION

BACKGROUND

I. Field of the Disclosure

The technology of the disclosure relates generally to electromagnetic interference (EMI), and particularly to mitigating effects of EMI.

II. Background

Mobile computing devices, such as mobile phones and computer tablets, have become increasingly prevalent in contemporary society. These mobile computing devices are commonly used for a multitude of everyday functions. For example, a mobile computing device may be used to make phone calls or send e-mail messages via a wireless modem. The same mobile computing device may also perform functions in conjunction with other electronic devices to which the mobile computing device is connected. For example, the mobile computing device may upload digital photographs to a desktop computer via a Universal Serial Bus (USB) cable or stream a video to a digital television via a High-Definition Multimedia Interface (HDMI) cable.

In this regard, a mobile computing device typically includes multiple controllers, wherein each controller includes circuitry that is configured to communicate with other electronic devices using a corresponding protocol. Further, each non-wireless protocol requires a particular type of cable that is configured to properly connect an electronic device to the mobile computing device. Information is transferred between the mobile computing device and the electronic device to achieve a desired function. However, as such information is transferred at increased frequencies, a greater amount of electromagnetic emissions is generated from the controllers and cables. This increase in electromagnetic emissions causes electromagnetic interference (EMI) that degrades the performance of other circuitry within the mobile computing device.

Additionally, continued miniaturization of mobile computing devices, combined with increased frequencies, further exacerbates the effects of EMI. In particular, as the circuit area within a mobile computing device decreases, circuit elements are placed closer together. This closer proximity of circuit elements increases the effects of EMI generated by the greater electromagnetic emissions resulting from higher frequencies. Therefore, it would be advantageous to provide designers with additional tools to successfully mitigate the effects of EMI within mobile computing devices as frequencies continue to increase in combination with decreasing device size.

SUMMARY OF THE DISCLOSURE

Aspects disclosed in the detailed description include priority arbitration for interference mitigation. In one aspect, a computing device is provided that employs a control system configured to arbitrate the activity of multiple interfaces. This arbitration mitigates potential electromagnetic interference (EMI) that may degrade the performance of the computing device. More specifically, upon a first interface requesting to become active, the control system is configured to determine if a second interface is currently active. If the second interface is currently active, the control system is configured to arbitrate the activity of the first interface and the second interface so as to mitigate the potential EMI that may be generated if the two interfaces are concurrently active. In this manner, the computing device includes an aggressor controller and a victim receiver. The control system is configured to arbitrate such activity so that the aggressor controller and a corresponding cable do not generate EMI during a time period that would degrade the performance of the victim receiver. Thus, the control system provides designers with an additional tool that may reduce the performance degradation of the victim receiver attributable to the EMI.

In this regard in one aspect, a computing device is disclosed. The computing device comprises an aggressor controller configured to couple to an external cable. The computing device further comprises a victim receiver. The computing device further comprises a control system coupled to the aggressor controller and the victim receiver. The control system is configured to, in response to a first interface issuing a request to enter an active state, determine if a second interface is in the active state. The control system is further configured to, in response to determining that the second interface is in the active state, issue a request to the second interface to enter a non-active state. The control system is further configured to, in response to requesting the second interface to enter the non-active state, determine if the second interface is in the non-active state. The control system is further configured to, in response to determining that the second interface is in the non-active state, issue a request for the first interface to enter the active state.

In another aspect, a method for mitigating EMI of a victim receiver caused by an aggressor controller is disclosed. The method comprises, in response to a first interface issuing a request to enter an active state, determining if a second interface is in the active state. The method further comprises, in response to determining that the second interface is in the active state, issuing a request to the second interface to enter a non-active state. The method further comprises, in response to requesting the second interface to enter the non-active state, determining if the second interface is in the non-active state. The method further comprises, in response to determining that the second interface is in the non-active state, issuing a request for the first interface to enter the active state.

In another aspect, a method for mitigating EMI of a wireless local area network (WLAN) modem and a Bluetooth™ modem caused by a Universal Serial Bus (USB) 3.0 controller is disclosed. The method comprises determining if a USB 3.0 controller issues a request to enter an active state. The method further comprises, in response to the USB 3.0 controller issuing the request to enter the active state, placing the USB 3.0 controller, a WLAN modem, and a Bluetooth™ modem in a non-active state. The method further comprises, in response to placing the WLAN modem and the Bluetooth™ modem in the non-active state, placing the USB 3.0 controller in the active state for a first amount of time.

In another aspect, a method for mitigating EMI of a WLAN modem and a Bluetooth™ modem caused by a USB 3.0 controller is disclosed. The method comprises determining if a USB 3.0 controller issues a request to enter an active state. The method further comprises, in response to the USB 3.0 controller issuing the request to enter the active state, placing the USB 3.0 controller and a WLAN modem in a non-active state. The method further comprises, in response to placing the USB 3.0 controller and the WLAN modem in the non-active state, placing a Bluetooth™ modem in the active state for a first-TDM amount of time. The method further comprises, following the first-TDM amount of time, placing the Bluetooth™ modem in the non-active state and placing the WLAN modem in the active state for a second- TDM amount of time. The method further comprises, following the second-TDM amount of time, placing the WLAN modem in the non-active state and placing the USB 3.0 controller in the active state for a third-TDM amount of time.

DETAILED DESCRIPTION

Figure 1:
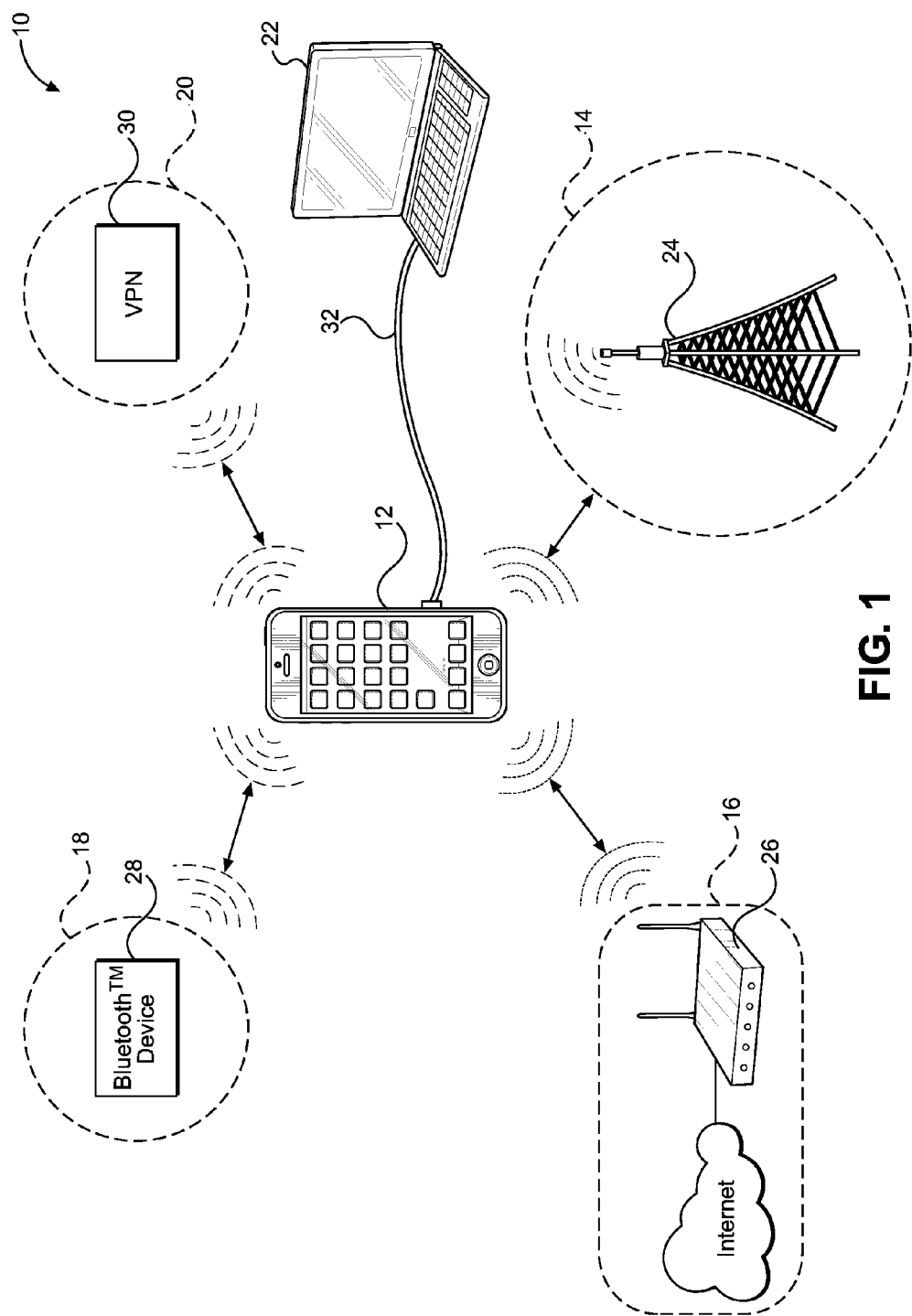
FIG. 1 is an illustration of an exemplary mobile computing device in a communications environment employing a plurality of networks and interfacing with a computing device via a cable.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include priority arbitration for interference mitigation. In one aspect, a computing device is provided that employs a control system configured to arbitrate the activity of multiple interfaces. This arbitration mitigates potential electromagnetic interference (EMI) that may degrade the performance of the computing device. More specifically, upon a first interface requesting to become active, the control system is configured to determine if a second interface is currently active. If the second interface is currently active, the control system is configured to arbitrate the activity of the first interface and the second interface so as to mitigate the potential EMI that may be generated if the two interfaces are concurrently active. In this manner, the computing device includes an aggressor controller and a victim receiver. The control system is configured to arbitrate such activity so that the aggressor controller and a corresponding cable do not generate EMI during a time period that would degrade the performance of the victim receiver. Thus, the control system provides designers with an additional tool that may reduce the performance degradation of the victim receiver attributable to the EMI.

Before addressing exemplary aspects of the present disclosure, additional material is provided about the nature of EMI within a mobile computing device. However, details of exemplary aspects of the present disclosure describing priority arbitration for interference mitigation begin with the description of FIG. 2 below. In this regard, FIG. 1 illustrates a simplified diagram of an exemplary communications environment 10 that includes a mobile computing device 12 operating with a plurality of networks 14, 16, 18, 20, and interfacing with a computing device 22. The mobile computing device 12 communicates with each of the networks 14, 16, 18, and 20 separately, as the networks 14, 16, 18, and 20 each employ a different communications technology. Further, the mobile computing device 12 communicates with the computing device 22 separately from the networks 14, 16, 18, and 20. For example, the network 14 includes a cellular base station 24 designed to support functions such as cellular phone and data communications with the mobile computing device 12. The network 16 is configured to support wireless fidelity ("Wi-Fi") communications, allowing the mobile computing device 12 to connect to other networks, such as the Internet, by way of a Wi-Fi router 26. The network 18 is configured to support Bluetooth™ technology, providing the mobile computing device 12 with the opportunity to communicate with a Bluetooth™-enabled device 28. Further, the network 20 supports communications using wide wireless area network (WWAN) technology. For example, the mobile computing device 12 may connect to the network 20 for a variety of purposes, such as connecting to a virtual private network (VPN) 30. Conversely, rather than using over the air transmissions to communicate with the computing device 22, the mobile computing device 12 exchanges information with the computing device 22 via a cable 32, such as a Universal Serial Bus (USB) 3.0 cable. To support such communications with the networks 14, 16, 18, and 20 and the computing device 22, the mobile computing device 12 includes circuit components individually configured to communicate with a particular communications technology.

Figure 2:
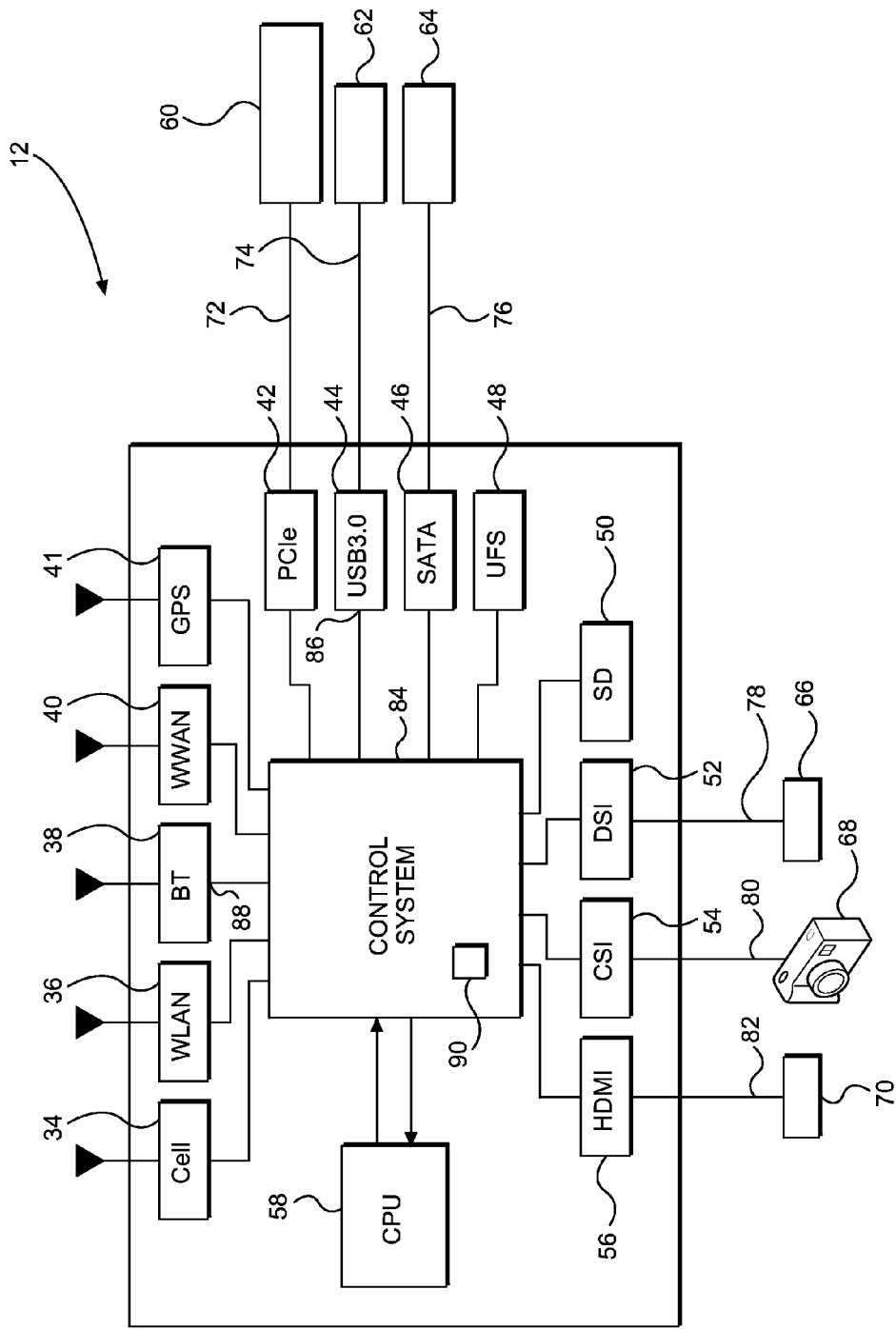
FIG. 2 is a simplified block diagram of internal circuitry of the mobile computing device of FIG. 1.

In this regard, FIG. 2 illustrates a simplified block diagram of internal circuitry of the mobile computing device 12 of FIG. 1. More specifically, the mobile computing device 12 includes modems 34, 36, 38, and 40, wherein each modem 34, 36, 38, and 40 is configured to communicate with a corresponding network 14, 16, 18, and 20 in FIG. 1. For example, the modem 34 is configured to communicate with the network 14 using a cellular communications protocol, such as, but not limited to, Global System for Mobile Communications (GSM), Long-Term Evolution (LTE), or Code Division Multiple Access (CDMA). The modem 36 supports Wi-Fi communications with the network 16 using wireless local area network (WLAN) technology, while the modem 38 supports communications via the Bluetooth™ protocol with the network 18. Further, the modem 40 supports communications with the network 20 via wireless WWAN technology. Notably, while the modems 34, 36, 38, and 40 in this aspect employ the above described protocols, other aspects may include additional or alternative modems that employ other protocols, such as a modem 41 that employs a Global Positioning System (GPS) protocol.

With continuing reference to FIG. 2, in addition to the modems 34, 36, 38, and 40, the mobile computing device 12 also includes controllers 42, 44, 46, 48, 50, 52, 54, and 56, wherein each is configured to support a particular non-wireless protocol. For example, the controllers 42, 44, and 46 support communications using a Peripheral Component Interconnect Express (PCIe) protocol, a Universal Serial Bus (USB) 3.0 protocol, and a Serial Advanced Technology Attachment (SATA) protocol, respectively. The controllers 48 and 50 support functionality with a Universal Flash Storage (UFS) and a Secure Digital (SD) device, respectively. Further, the controllers 52, 54, and 56 support a Display Serial Interface (DSI) protocol, a Camera Serial Interface (CSI) protocol, and a High-Definition Multimedia Interface (HDMI) protocol, respectively. Notably, while the controllers 42, 44, 46, 48, 50, 52, 54, and 56 in this aspect employ the above described non-wireless protocols, other aspects may include additional or alternative controllers that employ other protocols. Additionally, a central processing unit (CPU) 58 is included in the mobile computing device 12 to provide processing support for the modems 34, 36, 38, and 40 and the controllers 42, 44, 46, 48, 50, 52, 54, and 56.

With continuing reference to FIG. 2, although the controllers 42, 44, 46, 48, 50, 52, 54, and 56 provide important functionality to the mobile computing device 12, such circuitry may also degrade the performance of the modems 34, 36, 38, and 40. In particular, the controllers 42, 44, 46, 52, 54, and 56 are configured to communicate with corresponding devices 60, 62, 64, 66, 68, and 70 via associated external cables 72, 74, 76, 78, 80, and 82. Such communications involve transporting clock and data signals (not shown) between each controller 42, 44, 46, 52, 54, and 56 and its corresponding device 60, 62, 64, 66, 68, and 70. Especially at higher frequencies, these signals generate electromagnetic emissions (not shown) at each clock edge (not shown) on the external cables 72, 74, 76, 78, 80, and 82. Additionally, electromagnetic emissions may be generated by the circuitry associated with each controller 42, 44, 46, 48, 50, 52, 54, and 56. Such electromagnetic emissions cause EMI that degrades the operation of the modems 34, 36, 38, and 40. In effect, the controllers 42, 44, 46, 48, 50, 52, 54, and 56 act as "aggressor controllers" that create EMI that may degrade the performance of the "victim receiver" modems 34, 36, 38, and 40. For example, the EMI may alter the signals sent from and received by the modems 34, 36, 38, and 40. Altering these signals may produce errors in the information exchanged between each modem 34, 36, 38, and 40 and its corresponding networks 14, 16, 18, and 20, thus degrading performance.

In this regard, with continuing reference to FIG. 2, the mobile computing device 12 employs a control system 84 (also known as a "coexistence manager") that is configured to mitigate EMI of a victim receiver (e.g., one of the modems 34, 36, 38, and 40) caused by an aggressor controller (e.g., one of the controllers 42, 44, 46, 48, 50, 52, 54, and 56). Notably, the control system 84 may be implemented in hardware, software, or a combination of hardware and software. For purposes of a non-limiting example, the controller 44 is designated as the aggressor controller (also referred to herein as the "aggressor controller 44"), which is configured to couple to the external cable 74. Further, the modem 38 is designated as the victim receiver (also referred to herein as the "victim receiver 38"). Notably, in alternative aspects, any of the controllers 42, 44, 46, 48, 50, 52, 54, and 56 may be the aggressor controller, while any of the modems 34, 36, 38, and 40 may be the victim receiver. Additionally, in other aspects, the modems 34, 36, 38, and 40 may function as "aggressors," wherein the modems 34, 36, 38, and 40 generate EMI that may degrade the performance of the "victim" controllers 42, 44, 46, 48, 50, 52, 54, and 56. In alternative aspects, any of the controllers 42, 44, 46, 48, 50, 52, 54, and 56 may be the "aggressor," while any of the controllers 42, 44, 46, 48, 50, 52, 54, and 56 may also be the "victim." Further, in this aspect, a first interface 86 corresponds to the aggressor controller 44, while a second interface 88 corresponds to the victim receiver 38. However, in other aspects, the first interface 86 may correspond to the victim receiver 38, while the second interface 88 may correspond to the aggressor controller 44.

With continuing reference to FIG. 2, the control system 84 is coupled to the aggressor controller 44 and the victim receiver 38. In this manner, upon the first interface 86 issuing a request to enter an active state, the control system 84 is configured to determine if the second interface 88 (and by extension, the victim receiver 38) is in the active state. In this aspect, a circuit in the active state may complete transactions, while a circuit in the non-active state may not complete transactions. Examples of the non-active state include, but are not limited to, sleep, low power, idle, and power off states. If the control system 84 determines that the second interface 88 is in the active state, the control system 84 is configured to issue a request to the second interface 88 to enter a non-active state. In response to issuing this request, the control system 84 is configured to determine if the second interface 88 complies and enters the non-active state. If the control system 84 determines that the second interface 88 is not in the non-active state (i.e., active), the control system 84 is configured to determine whether a timer 90 has expired. If the timer 90 has not expired, the control system 84 is configured to again check whether the second interface 88 is in the non-active state. However, if the timer 90 has expired, the control system 84 is configured to issue a request for the first interface 86 to enter the active state.

With continuing reference to FIG. 2, in other aspects, the control system 84 may also be configured to place the second interface 88 in the non-active state if the timer 90 has expired so that the second interface 88 does not cause interference with the first interface 86 upon the first interface 86 entering the active state. Further, when the control system 84 determines that the second interface 88 is in the non-active state, the control system 84 is configured to issue a request for the first interface 86 (and by extension, the aggressor controller 44) to enter the active state. Notably, in requesting that the first interface 86 (or alternatively, the second interface 88) enter the non-active state, such a request may place the first interface 86 (or the second interface 88), the corresponding aggressor controller 44, or a sub-part thereof, in the non-active state. Additionally, in some aspects, if the first interface 86 is placed in the non-active state, the second interface 88 may be enabled, wherein the second interface 88 is allowed to enter the active state upon having transactions to complete. Similarly in such aspects, if the second interface 88 is placed in the non-active state, the first interface 86 may be enabled. Further, if one or more of the controllers 52 (CSI protocol), 54 (DSI protocol), and 56 (HDMI protocol) are employed in the mobile computing device 12, each respective controller 52, 54, and 56 is employed as a second aggressor controller (not shown), which is operatively coupled to the control system 84. Because the controllers 52, 54, and 56 support display protocols, and thus cannot enter the non-active state, the control system 84 is configured to place the corresponding second aggressor controller in a pseudo-non-active state (e.g., a state with a reduced frequency or alternative mode, rather than a low power or sleep state) to reduce EMI.

With continuing reference to FIG. 2, during the time in which the first interface 86 is in the active state, the control system 84 is configured to monitor whether the second interface 88 issues a request to place the first interface 86 in the non-active state. When the second interface 88 issues such a request, the control system 84 is configured to place the first interface 86 in the non-active state. In this manner, the control system 84 is configured to arbitrate the activity of the first interface 86 and the second interface 88 so as to mitigate the potential EMI that may be generated if the first interface 86 and the second interface 88 are concurrently active. Such arbitration is designed so that the aggressor controller 44 and the corresponding external cable 74 do not generate EMI during a time period that would degrade the performance of the victim receiver 38. In other words, one goal of the arbitration is to prevent the aggressor controller 44 from being active (and thus, generating EMI) while the victim receiver 38 is active. Thus, the control system 84 provides designers with an additional tool that may reduce the performance degradation of the victim receiver 38 attributable to the EMI caused by the aggressor controller 44 and the corresponding external cable 74.

Figure 3:
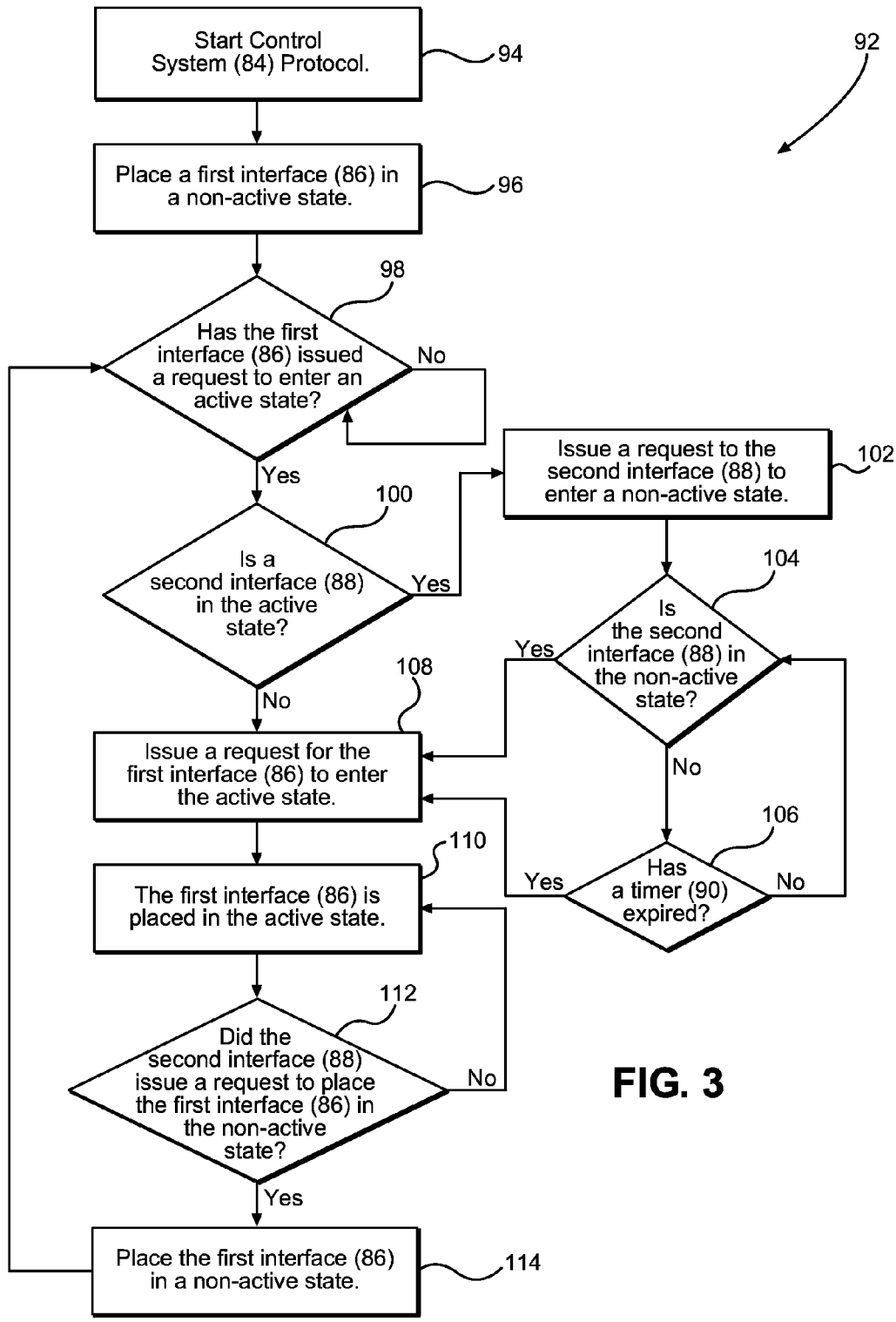
FIG. 3 is a flowchart illustrating an exemplary process for mitigating electromagnetic interference (EMI) of a victim receiver caused by an aggressor controller in the mobile computing device of FIG. 2.

In this regard, FIG. 3 illustrates an exemplary process 92 employed by the control system 84 for mitigating EMI of the victim receiver 38 caused by the aggressor controller 44 in the mobile computing device 12 of FIG. 2. In this manner, a protocol implemented by the control system 84 is initialized, for example, during startup of the mobile computing device 12 (block 94). Following such initialization, the control system 84 places the first interface 86 (and by extension, the aggressor controller 44) in a non-active state (e.g., a sleep or low power state) (block 96). The control system 84 then determines if the first interface 86 has issued a request to enter the active state (block 98). If the first interface 86 has not issued such a request, the control system 84 monitors the first interface 86 until a request to enter the active state is issued. Upon the first interface 86 issuing a request to enter the active state, the control system 84 determines if the second interface 88 (and by extension, the victim receiver 38) is in the active state (block 100). If the control system 84 determines that the second interface 88 is in the active state, the control system 84 issues a request to the second interface 88 to enter the non-active state (block 102). In response to issuing this request, the control system 84 determines if the second interface 88 complies and enters the non-active state (block 104). Upon issuing this request, the control system 84 determines whether the timer 90 has expired (block 106). If the timer 90 has not expired, the control system 84 again checks to determine if the second interface 88 has entered the non-active state in block 104. However, if the timer 90 has expired, or if the control system 84 determined that the second interface 88 was not in the active state in block 100, the control system 84 issues a request for the first interface 86 to enter the active state (block 108). In response to this request, the first interface 86 (and thus, the aggressor controller 44) is placed in the active state (block 110).

With continuing reference to FIG. 3, during the time in which the first interface 86 is in the active state, the control system 84 monitors whether the second interface 88 issues a request to place the first interface 86 in the non-active state (block 112). If no such request is issued, the first interface 86 remains in the active state in block 110. However, if the second interface 88 issues such a request, the control system 84 places the first interface 86 in the non-active state (i.e., places the aggressor controller 44 in a sleep mode) (block 114). Further, the control system 84 returns to block 98 to determine if the first interface 86 has issued another request to enter the active state. Additionally, in some aspects, the first interface 86 may enter the active state per a second timer (not shown) or other priority configuration. In this manner, the process 92 allows the control system 84 to arbitrate the activity of the first interface 86 and the second interface 88 so as to mitigate the potential EMI that may be generated if the first interface 86 and the second interface 88 are concurrently active. Such arbitration is designed so that the aggressor controller 44 and the corresponding external cable 74 of FIG. 2 do not generate EMI during a time period that would degrade the performance of the victim receiver 38. Thus, the process 92 provides designers with an additional tool that may reduce the performance degradation of the victim receiver 38 attributable to the EMI caused by the aggressor controller 44 and the corresponding external cable 74.

Figure 4:
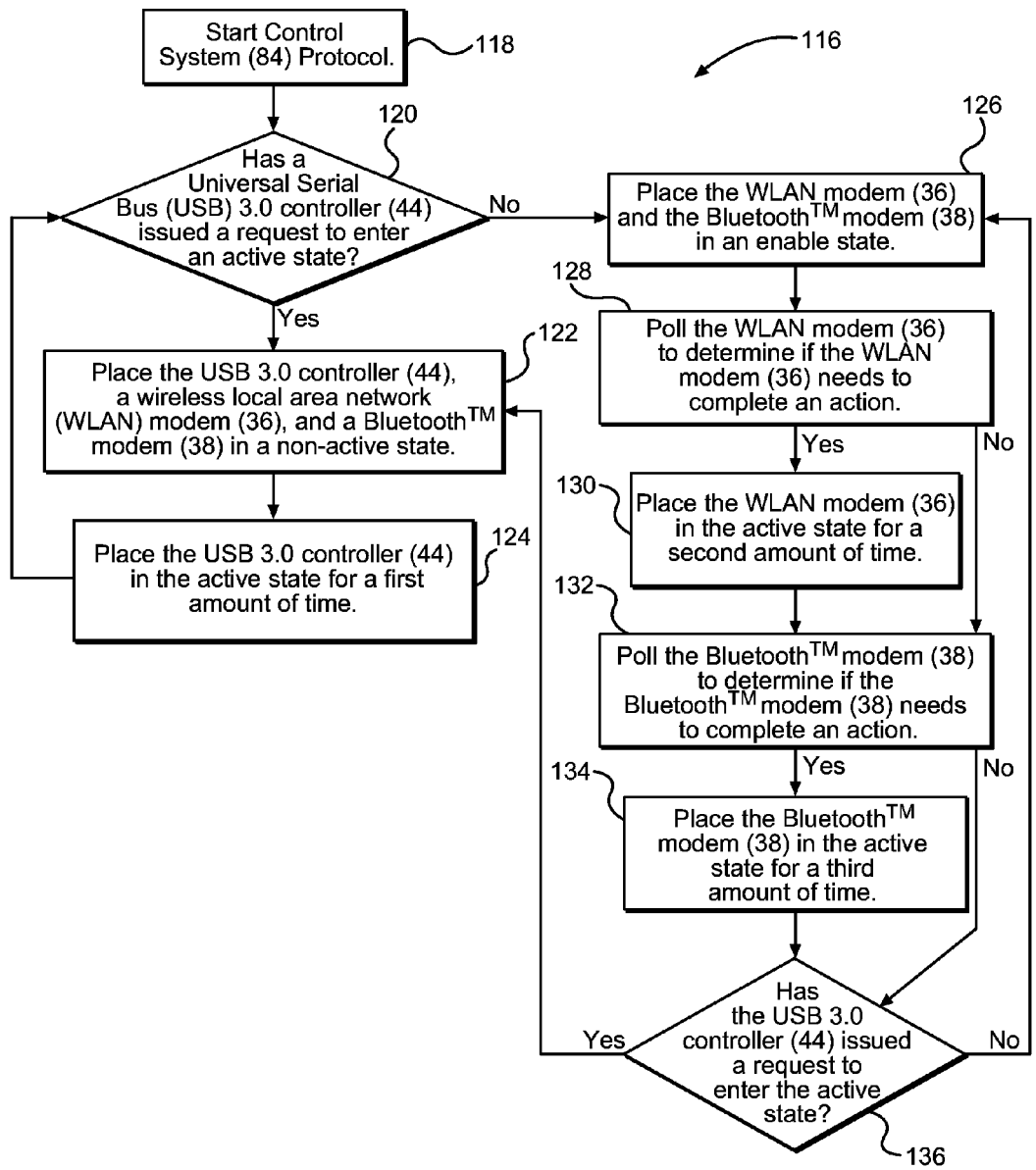
FIG. 4 is a flowchart illustrating a specific exemplary process for mitigating EMI of a victim receiver caused by an aggressor controller in the mobile computing device of FIG. 2 using polling.

While the process 92 of FIG. 3 describes general arbitration, the control system 84 of FIG. 2 may employ alternative, more specific processes. In this regard, FIG. 4 illustrates an exemplary process 116 employed by the control system 84 for mitigating victimization of the modem 36 (also referred to herein as the "WLAN modem 36") and the modem 38 (also referred to herein as the "Bluetooth™ modem 38") caused by the EMI from the controller 44 (also referred to herein as the "USB 3.0 controller 44"). The mitigation is achieved using a polling scheme. In this manner, a protocol implemented by the control system 84 is initialized, for example, during startup of the mobile computing device 12 (block 118). Following such initialization, the control system 84 determines whether the USB 3.0 controller 44 has issued a request to enter an active state (block 120). If the USB 3.0 controller 44 has issued such a request, the control system 84 places the USB 3.0 controller 44, the WLAN modem 36, and the Bluetooth™ modem 38 in a non-active state (block 122). After each of these devices is in the non-active state, the control system 84 places the USB 3.0 controller 44 in the active state for a first amount of time (block 124). In this manner, upon placing the USB 3.0 controller 44 in the active state, the control system 84 allows the USB 3.0 controller 44 to complete actions during the defined first amount of time. Once the first amount of time has elapsed, the control system 84 determines whether the USB 3.0 controller 44 has additional actions to complete by determining if the USB 3.0 controller 44 has issued another request to enter the active state in block 120.

With continuing reference to FIG. 4, if the control system 84 determines that the USB 3.0 controller 44 has not issued a request to enter the active state in block 120, the control system 84 places the WLAN modem 36 and the Bluetooth™ modem 38 in an enable state (block 126). In this aspect, the enable state prepares the WLAN modem 36 and the Bluetooth™ modem 38 to enter the active state at some future time. Once the WLAN modem 36 and the Bluetooth™ modem 38 are both in the enable state, the control system 84 polls the WLAN modem 36 to determine if the WLAN modem 36 needs to complete an action (block 128). If the WLAN modem 36 needs to complete an action, the control system 84 places the WLAN modem 36 in the active state for a second amount of time (block 130). However, if the WLAN modem 36 does not need to complete an action in block 128, or once the second amount of time in block 130 has elapsed, the control system 84 polls the Bluetooth™ modem 38 to determine if the Bluetooth™ modem 38 needs to complete an action (block 132). If the Bluetooth™ modem 38 needs to complete an action, the control system 84 places the Bluetooth™ modem 38 in the active state for a third amount of time (block 134). However, if the Bluetooth™ modem 38 does not need to complete an action in block 132, or once the third amount of time in block 134 has elapsed, the control system 84 determines whether the USB 3.0 controller 44 has issued a request to enter the active state (block 136). If the USB 3.0 controller 44 has issued such a request, the control system 84 places the USB 3.0 controller 44, the WLAN modem 36, and the Bluetooth™ modem 38 in the non-active state in block 122. Otherwise, the control system 84 places the WLAN modem 36 and the Bluetooth™ modem 38 in the enable state in block 126.

In this manner, the process 116 gives priority to the USB 3.0 controller 44 and polls the WLAN modem 36 and the Bluetooth™ modem 38 when the USB 3.0 controller 44 does not have actions to complete. Further, in this aspect, the USB 3.0 controller 44 has priority over the WLAN modem 36 and the Bluetooth™ modem 38. Because the USB 3.0 controller 44 is given priority over the WLAN modem 36 and the Bluetooth™ modem 38 in this aspect, the USB 3.0 controller 44 will not be concurrently active with the WLAN modem 36 and the Bluetooth™ modem 38. Thus, employing the process 116 in the control system 84 provides designers with an additional tool that may reduce the performance degradation of the WLAN modem 36 and the Bluetooth™ modem 38 attributable to the EMI caused by the USB 3.0 controller 44 and the corresponding external cable 74. Notably, other aspects may employ alternative priority schemes that may be modified dynamically via changing software configurations according to a given application, while still achieving a reduction in performance degradation attributable to EMI. Further, the control system 84 may be configured to adaptively learn and set various states and/or modes based on specific properties of the given controllers and victims.

Figure 5:
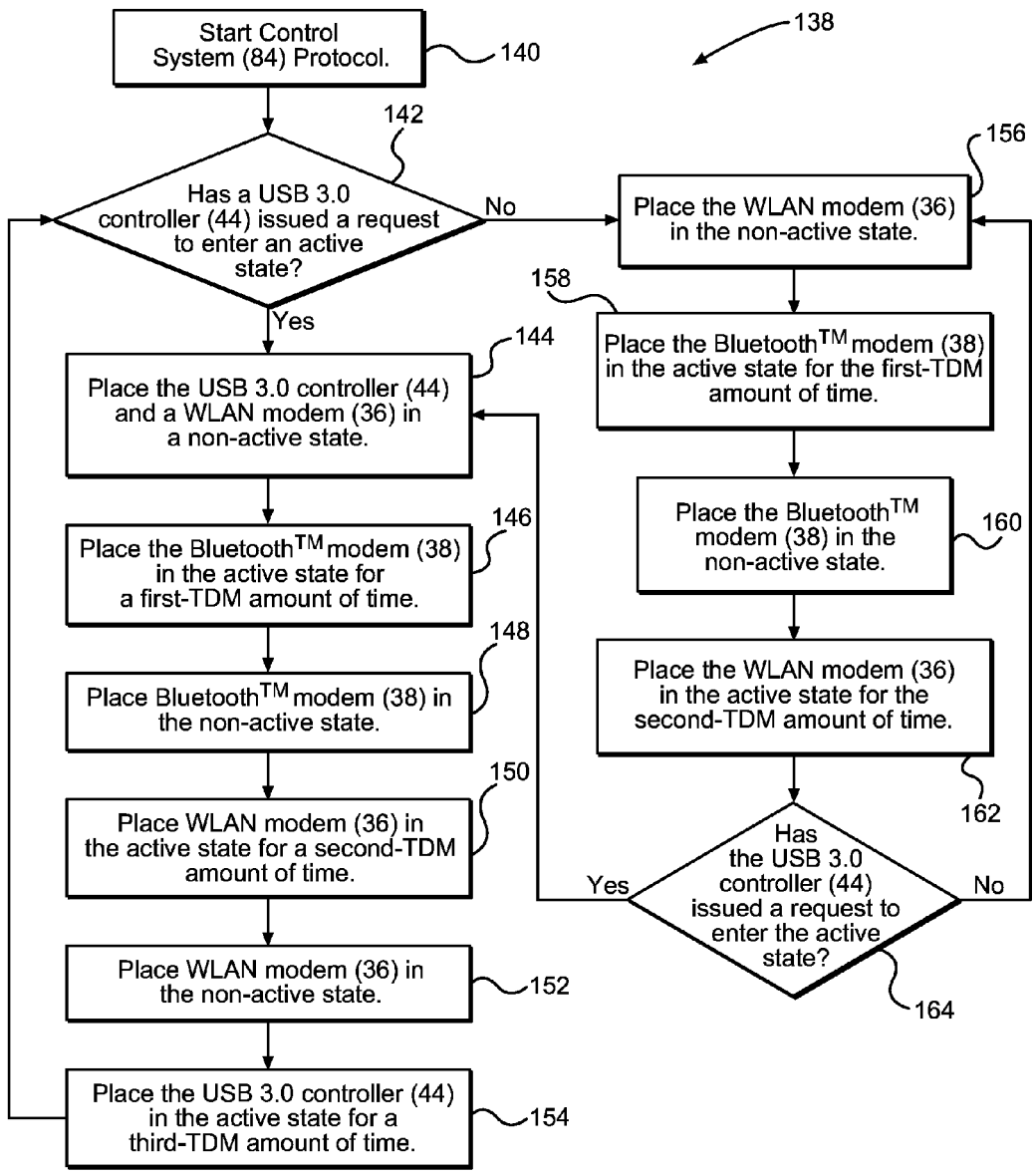
FIG. 5 is a flowchart illustrating a specific exemplary process for mitigating EMI of a victim receiver caused by an aggressor controller in the mobile computing device of FIG. 2 using time division multiplexing.

Additionally, FIG. 5 illustrates an exemplary process 138 employed by the control system 84 of FIG. 2 for mitigating EMI of the WLAN modem 36 and the Bluetooth™ modem 38 caused by the USB 3.0 controller 44 using time division multiplexing (TDM). In this manner, a protocol implemented by the control system 84 is initialized, for example, during startup of the mobile computing device 12 (block 140). Following such initialization, the control system 84 determines whether the USB 3.0 controller 44 has issued a request to enter an active state (block 142). If the USB 3.0 controller 44 has issued such a request, the control system 84 places the USB 3.0 controller 44 and the WLAN modem 36 in a non-active state (block 144). Once the USB 3.0 controller 44 and the WLAN modem 36 are in a non-active state, the control system 84 places the Bluetooth™ modem 38 in the active state for a first-TDM amount of time (block 146). In this manner, upon placing the Bluetooth™ modem 38 in the active state, the control system 84 allows the Bluetooth™ modem 38 to complete actions during the first-TDM amount of time. Once the first-TDM amount of time has elapsed, the control system 84 places the Bluetooth™ modem 38 in the non-active state (block 148). The control system 84 then places the WLAN modem 36 in the active state for a second-TDM amount of time (block 150). Similar to the Bluetooth™ modem 38, upon placing the WLAN modem 36 in the active state, the control system 84 allows the WLAN modem 36 to complete actions during the second-TDM amount of time. After the second-TDM amount of time has elapsed, the control system 84 places the WLAN modem 36 in the non-active state (block 152). Once the WLAN modem 36 is in the non-active state, the control system 84 places the USB 3.0 controller 44 in the active state for a third-TDM amount of time, thus allowing the USB 3.0 controller 44 to complete actions (block 154). Following the third-TDM amount of time, the control system 84 again determines if the USB 3.0 controller 44 has issued another request to enter the active state in block 142.

With continuing reference to FIG. 5, if the control system 84 determines that the USB 3.0 controller 44 has not issued the request to enter the active state in block 142, the control system 84 places the WLAN modem 36 in the non-active state (block 156). After the WLAN modem 36 is placed in the non-active state, the control system 84 places the Bluetooth™ modem 38 in the active state for the first-TDM amount of time (block 158). Thus, the Bluetooth™ modem 38 is allowed to complete actions for the duration of the first-TDM amount of time. Once the first-TDM amount of time has elapsed, the control system 84 places the Bluetooth™ modem 38 in the non-active state (block 160). The control system 84 then places the WLAN modem 36 in the active state for the second-TDM amount of time (block 162). Following the second-TDM amount of time, during which the WLAN modem 36 was able to complete actions, the control system 84 determines if the USB 3.0 controller 44 has issued a request to enter the active state (block 164). If such as request has been issued, the control system 84 completes the steps in blocks 144-154 to continue the process of placing the Bluetooth™ modem 38, the WLAN modem 36, and the USB 3.0 controller 44 in the active state during individual periods of time. However, if no such request has been issued, the control system 84 completes the steps in blocks 156-162 to continue the process of placing only the Bluetooth™ modem 38 and the WLAN modem 36 in the active state during individual periods of time.

In this manner, the process 138 divides time in the active state between the Bluetooth™ modem 38, the WLAN modem 36, and the USB 3.0 controller 44. Further, in this aspect, the first-TDM amount of time, the second-TDM amount of time, and the third-TDM amount of time for which the control system 84 places each respective device in the active state may be based on a priority scheme. More specifically, the duration of each respective amount of time may be set to reflect a desired priority for the corresponding device. As a non-limiting example, the first-TDM amount of time may have a greater duration than the second-TDM amount of time. The second-TDM amount of time may have a greater duration than the third-TDM amount of time. Thus, in this example, the Bluetooth™ modem 38 has priority over the WLAN modem 36 while the WLAN modem 36 has priority over the USB 3.0 controller 44. Further, similar to the process 92 and the process 116, the process 138 works to prevent the USB 3.0 controller 44 from being concurrently active with the WLAN modem 36 and the Bluetooth™ modem 38. Therefore, employing the process 138 in the control system 84 provides designers with an additional tool that may reduce the performance degradation of the WLAN modem 36 and the Bluetooth™ modem 38 attributable to the EMI caused by the USB 3.0 controller 44 and the corresponding external cable 74.

The priority arbitration for interference mitigation according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, an infotainment system, and a portable digital video player.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computing device comprising:
   an aggressor controller configured to couple to an external cable;
   a victim receiver; and
   a control system coupled to the aggressor controller and the victim receiver, configured to:
      in response to a first interface issuing a request to enter an active state, determine if a second interface is in the active state;
      in response to determining that the second interface is in the active state, issue a request to the second interface to enter a non-active state;
      in response to requesting the second interface to enter the non-active state, determine if the second interface has entered the non-active state;
      in response to determining that the second interface is in the non-active state, issue a request for the first interface to enter the active state;
      while the first interface is in the active state, determine if the second interface issues a request to place the first interface in the non-active state; and
      in response to the request to place the first interface in the non-active state, place the first interface in the non-active state.

2. The computing device of claim 1, wherein the control system is further configured to:
   in response to determining that the second interface is not in the non-active state, determine if a timer has expired;
   in response to the timer not being expired, determine if the second interface is in the non-active state; and
   in response to the timer being expired, issue the request for the first interface to enter the active state.

3. The computing device of claim 2, wherein the control system is further configured to, in response to the timer being expired, place the second interface in the non-active state.

4. The computing device of claim 1, wherein:
   the first interface corresponds to the aggressor controller; and
   the second interface corresponds to the victim receiver.

5. The computing device of claim 1, wherein:
   the first interface corresponds to the victim receiver; and
   the second interface corresponds to the aggressor controller.

6. The computing device of claim 1, wherein the aggressor controller comprises a Universal Serial Bus (USB) 3.0 controller.

7. The computing device of claim 1, further comprising a second aggressor controller comprising a High-Definition Multimedia Interface (HDMI) controller, wherein the second aggressor controller is operatively coupled to the control system.

8. The computing device of claim 1, further comprising a second aggressor controller comprising a Camera Serial Interface (CSI) controller, wherein the second aggressor controller is operatively coupled to the control system.

9. The computing device of claim 1, wherein the aggressor controller comprises a Peripheral Component Interconnect Express (PCIe) controller.

10. The computing device of claim 1, wherein the aggressor controller comprises a Serial Advanced Technology Attachment (SATA) controller.

11. The computing device of claim 1, further comprising a second aggressor controller comprising a Display Serial Interface (DSI) controller, wherein the second aggressor controller is operatively coupled to the control system.

12. The computing device of claim 1, wherein the victim receiver comprises a modem configured to communicate with a Bluetooth™-enabled device.

13. The computing device of claim 1, wherein the victim receiver comprises a modem configured to communicate with a wireless local area network (WLAN).

14. The computing device of claim 1, wherein the victim receiver comprises a modem configured to communicate with a global positioning system (GPS) protocol.

15. The computing device of claim 1, wherein the victim receiver comprises a modem configured to communicate with a wireless wide area network (WWAN).

16. The computing device of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; an infotainment system; and a portable digital video player.

17. The computing device of claim 1, wherein:
the first interface is configured to support a non-wireless protocol over the external cable; and
the second interface is configured to support a wireless protocol.

18. A method for mitigating electromagnetic interference (EMI) of a victim receiver caused by an aggressor controller, comprising:
in response to a first interface issuing a request to enter an active state, determining if a second interface is in the active state;
in response to determining that the second interface is in the active state, issuing a request to the second interface to enter a non-active state;
in response to requesting the second interface to enter the non-active state, determining if the second interface has entered is in the non-active state;
in response to determining that the second interface is in the non-active state, issuing a request for the first interface to enter the active state;
while the first interface is in the active state, determining if the second interface issues a request to place the first interface in the non-active state; and
in response to the request to place the first interface in the non-active state, placing the first interface in the non-active state.

19. The method of claim 18, further comprising:
in response to determining that the second interface is not in the non-active state, determining if a timer has expired;
in response to the timer not being expired, determining if the second interface is in the non-active state; and
in response to the timer being expired, issuing the request for the first interface to enter the active state.

20. The method of claim 18, wherein:
the first interface corresponds to an aggressor controller; and
the second interface corresponds to a victim receiver.

21. The method of claim 18, wherein:
the first interface corresponds to a victim receiver; and
the second interface corresponds to an aggressor controller.

22. The method of claim 18, comprising:
in response to the first interface supporting a non-wireless protocol over an external cable issuing the request to enter the active state, determining if the second interface is in the active state; and
in response to determining that the second interface supporting a wireless protocol is in the active state, issuing the request to the second interface to enter the non-active state.

23. A method for mitigating electromagnetic interference (EMI) of a wireless local area network (WLAN) modem and a Bluetooth™ modem caused by a Universal Serial Bus (USB) 3.0 controller, comprising:
determining if a USB 3.0 controller issues a request to enter an active state;
in response to the USB 3.0 controller issuing the request to enter the active state, placing the USB 3.0 controller, a WLAN modem, and a Bluetooth™ modem in a non-active state;
in response to placing the WLAN modem and the Bluetooth™ modem in the non-active state, placing the USB 3.0 controller in the active state for a first amount of time; and
following the first amount of time, determining if the USB 3.0 controller issues a request to enter the active state.

24. The method of claim 23, further comprising:
in response to the USB 3.0 controller not issuing the request to enter the active state, placing the WLAN modem and the Bluetooth™ modem in an enable state;
polling the WLAN modem to determine if the WLAN modem needs to complete an action;
in response to determining that the WLAN modem needs to complete the action, placing the WLAN modem in the active state for a second amount of time;
following the second amount of time, polling the Bluetooth™ modem to determine if the Bluetooth™ modem needs to complete an action; and
in response to determining that the Bluetooth™ modem needs to complete the action, placing the Bluetooth™ modem in the active state for a third amount of time.

25. The method of claim 24, further comprising following the third amount of time, determining if the USB 3.0 controller issues a request to enter the active state.

26. The method of claim 25, further comprising in response to determining that the USB 3.0 controller has not issued the request to enter the active state, placing the WLAN modem and the Bluetooth™ modem in the enable state.

27. A method for mitigating electromagnetic interference (EMI) of a wireless local area network (WLAN) modem and a Bluetooth™ modem caused by a Universal Serial Bus (USB) 3.0 controller, comprising:
determining if a USB 3.0 controller issues a request to enter an active state;
in response to the USB 3.0 controller issuing the request to enter the active state, placing the USB 3.0 controller and a WLAN modem in a non-active state;
in response to placing the USB 3.0 controller and the WLAN modem in the non-active state, placing a Bluetooth™ modem in the active state for a first-time division multiplexing (TDM) amount of time;

following the first-TDM amount of time, placing the Bluetooth™ modem in the non-active state and placing the WLAN modem in the active state for a second-TDM amount of time;

following the second-TDM amount of time, placing the WLAN modem in the non-active state and placing the USB 3.0 controller in the active state for a third-TDM amount of time;

in response to the USB 3.0 controller not issuing the request to enter the active state, placing the WLAN modem in the non-active state; and in response to placing the WLAN modem in the non-active state, placing the Bluetooth™ modem in the active state for the first-TDM amount of time.

28. The method of claim 27, further comprising:

following the first-TDM amount of time, placing the Bluetooth™ modem in the non-active state;

in response to placing the Bluetooth™ modem in the non-active state, placing the WLAN modem in the active state for the second-TDM amount of time; and following the second-TDM amount of time, determining if the USB 3.0 controller issues a request to enter the active state.

* * * * *